US008024652B2

(12) United States Patent
Rasmussen et al.

(10) Patent No.: US 8,024,652 B2
(45) Date of Patent: Sep. 20, 2011

(54) TECHNIQUES TO ASSOCIATE INFORMATION BETWEEN APPLICATION PROGRAMS

(75) Inventors: David J. Rasmussen, Redmond, WA (US); Alex J. Simmons, Seattle, WA (US); Christopher H. Pratley, Seattle, WA (US); Olya Veselova, Seattle, WA (US); Peyush Bansal, Redmond, WA (US); David Garber, Bellevue, WA (US); Igor Kofman, San Francisco, CA (US); Donovan Lange, Seattle, WA (US); Emily Pitler, Mclean, VA (US)

(73) Assignee: Microsoft Corporation, Redmond, WA (US)

( * ) Notice: Subject to any disclaimer, the term of this patent is extended or adjusted under 35 U.S.C. 154(b) by 1167 days.

(21) Appl. No.: 11/784,888

(22) Filed: Apr. 10, 2007

(65) Prior Publication Data
US 2008/0256113 A1 Oct. 16, 2008

(51) Int. Cl.
*G06F 17/00* (2006.01)
(52) U.S. Cl. ........................................ 715/230
(58) Field of Classification Search ............... 715/230
See application file for complete search history.

(56) References Cited

U.S. PATENT DOCUMENTS

| | | | |
|---|---|---|---|
| RE34,476 E | 12/1993 | Norwood | |
| 6,504,956 B1 | 1/2003 | Gannage et al. | |
| 6,735,741 B1 * | 5/2004 | Pannu | 715/234 |
| 6,802,041 B1 | 10/2004 | Rehm | |
| 6,877,137 B1 | 4/2005 | Rivette et al. | |
| 6,965,752 B2 | 11/2005 | Allen et al. | |
| 7,487,540 B2 * | 2/2009 | Shipp | 726/22 |
| 7,596,766 B1 * | 9/2009 | Sharma et al. | 715/854 |
| 2002/0145742 A1 | 10/2002 | Koenig et al. | |
| 2003/0135824 A1 | 7/2003 | Ullmann et al. | |
| 2004/0168133 A1 | 8/2004 | Wynn et al. | |
| 2005/0114521 A1 | 5/2005 | Lee et al. | |
| 2005/0234838 A1 * | 10/2005 | Manousos et al. | 705/500 |
| 2005/0234893 A1 | 10/2005 | Hirsch | |
| 2006/0075347 A1 | 4/2006 | Rehm | |

FOREIGN PATENT DOCUMENTS

WO WO03017132 A1 2/2003

OTHER PUBLICATIONS

"Microsoft Office OneNote 2007 top 10 benefits".
"New in Opera 9".
"Welcome to Google Notebook".
Price, et al., "Linking by Inking: Trailblazing in a paper-like Hypertext", Date: 1998.

* cited by examiner

*Primary Examiner* — Andy Ho

(57) ABSTRACT

Techniques to cross-reference information for application programs are described. An apparatus may comprise a first application program to create notes for an operator, a second application program to display a target document, and a context reference module to generate a context reference for the target document indicating a source for the target document, display the context reference, and associate the context reference with a note. Other embodiments are described and claimed.

20 Claims, 5 Drawing Sheets

200

CREATE A NOTE WITH A FIRST APPLICATION PROGRAM
202

GENERATE A CONTEXT REFERENCE FOR A DOCUMENT FOR A SECOND APPLICATION PROGRAM
204

DISPLAY THE CONTEXT REFERENCE
206

ASSOCIATE THE CONTEXT REFERENCE WITH THE NOTE
208

FIG. 2A

TECHNIQUES TO ASSOCIATE INFORMATION BETWEEN APPLICATION PROGRAMS

RELATED CASE

The present application is related to commonly owned U.S. patent application Ser. No. 11/786,005 filed on Apr. 10, 2007 titled "TECHNIQUES TO DISPLAY ASSOCIATED INFORMATION BETWEEN APPLICATION PROGRAMS," the entirety of which is hereby incorporated by reference.

BACKGROUND

User information may be created and maintained using many different application programs and systems. In some cases, information from one application program may be made available to another application program, essentially becoming shared information. For example, a word processing application program may be used to generate a word processing document containing embedded spreadsheet information maintained by a separate spreadsheet application. As modifications are made to the spreadsheet information, the modifications are automatically replicated to the embedded spreadsheet information in a dynamic manner. Since shared information is managed by multiple application programs, however, accessing shared information from one or more application programs could be inefficient or cumbersome from a user perspective. Consequently, there may be a need for improved techniques for managing and accessing shared information between multiple application programs in an efficient and effective manner to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are generally directed to techniques for sharing information between application programs. Some embodiments are particularly directed to techniques for accessing information from one application program that is managed or maintained by another application program. For example, an apparatus such as a computing device or system may include a first application program to create information in the form of notes for an operator or user. A second application program may be used to generate or display a target document. A context management module may be arranged to manage information shared between the first and second application programs, such as a note with a target document or vice-versa.

In one embodiment, for example, the context management module may include a context reference module. The context reference module may be arranged to generate a context reference for the target document. The context reference may indicate a source, storage location or pointer for the target document. The context reference module may display a list of context references for an operator. The context reference module may be used to associate the context reference with a note. For example, an operator may select the context reference and associate the context reference with a given note using menu selections or a graphics user interface (GUI) to drag-and-drop the context reference within an open GUI window for the note. In this manner, an operator may efficiently associate a note with a given target document, thereby allowing the operator to more easily reference the target document when viewing the note, or vice-versa.

In one embodiment, for example, the context management module may include a context recording module. The context recording module may be arranged to record context information for a target document. The context information may include, for example, a context reference associated with the note. The context information may further include GUI information for the GUI window used to display the target document when the note was originally taken, such as position of a GUI window, size of a GUI window, a scroll position of a GUI window, and any other state information useful in replicating a context for the environment of the target document as recorded when the note was originally authored.

In one embodiment, for example, the context management module may include a context generation module. The context generation module may be arranged to generate a context for a note using the context reference and context information. For example, the context generation module may be arranged to display a document view for the target document using the stored context information when the note is displayed in order to recreate a context for the target document familiar to an author of the note. Other embodiments are described and claimed.

BRIEF DESCRIPTION OF THE DRAWINGS

FIG. 2A illustrates one embodiment of a first logic flow.

DETAILED DESCRIPTION

Figure 1:
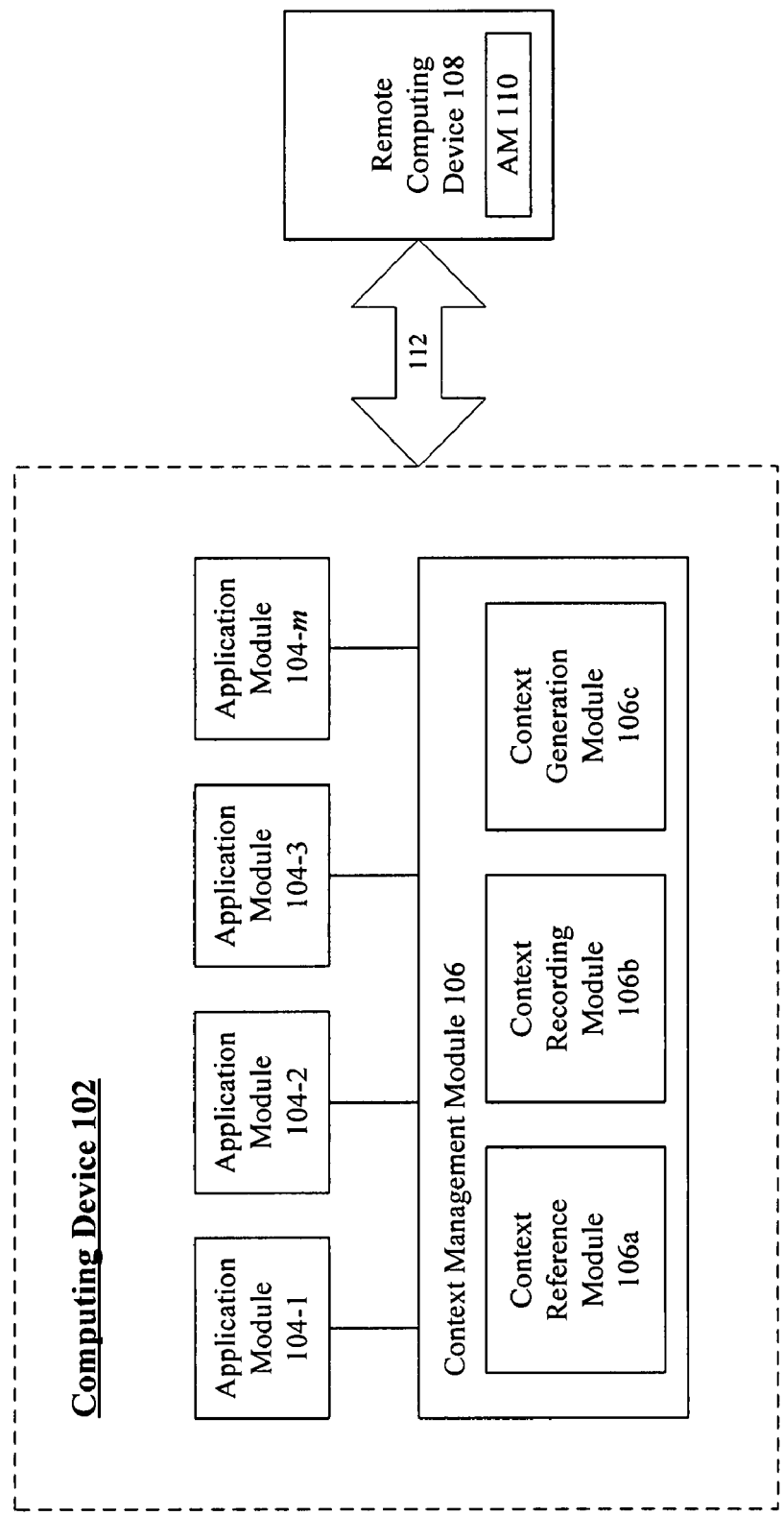
FIG. 1 illustrates one embodiment of a computing system.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be directed to techniques to improve sharing information between multiple application programs. For example, a computing device may include a first application program to create information such as notes for an operator, and a second application program to generate or display a target document. In one embodiment, for example, the first and second application programs may be from the MICROSOFT® OFFICE suite of application programs, made by Microsoft Corporation, Redmond, Wash. An example of a first application program may include, but is not limited to, a MICROSOFT OFFICE ONENOTE® application program, usually referred to as MICROSOFT ONENOTE. An example of a second application program may include, but is not limited to, a MICROSOFT OFFICE WORD application program, usually referred to as MICROSOFT WORD. Although some embodiments may be described with these two application programs by way of example only, it may be appreciated that any application programs may be used and still fall within the scope of the embodiments. Further, the term "target document" may include any set of discrete information, such as a document, data file, object, item, and so forth. For example, the second application program may comprise, but is not limited to, a MICROSOFT OUTLOOK® application program, usually referred to as MICROSOFT OUTLOOK. In this case, the target document may include various MICROSOFT OUTLOOK defined items, such as an email item, contact item, a calendar item, a note item, a meeting item, and so forth. The embodiments are not limited in this context.

Various embodiments may include a context management module. The context management module may generally manage context management operations for a computer device or system. In some implementations, the context management module may include various modules, such as a context reference module, a context recording module, and a context generation module. Although some embodiments may be described with these three modules by way of example and not limitation, it may be appreciated that the context management module may be implemented using more or less modules as desired for a given set of design parameters or performance constraints.

The context reference module may be generally arranged to manage information shared or associated between the first and second application programs. For example, the context reference module may be arranged to associate or link one or more notes created and managed by MICROSOFT ONENOTE with a target document from MICROSOFT WORD or some other application program. For example, an operator may desire to take notes about information displayed by a target document. The note may be open in a first GUI window showing a note view, while the target document may be open in a second GUI window showing a document view. When reviewing the notes, the operator may want to review the target document as well. This may be accomplished by inserting a link to the open document within the actual note. In some cases, however, there may not be a link to where the open document is stored readily available. Accordingly, the context reference module may display a list of context references for documents that are currently in open GUI windows, for example, and allow an operator to select and insert the desired context references into the note application program or the note itself.

Once a context reference is associated with a note, the context recording module may initiate context recording operations to record context information for the corresponding target document. The context information may include, for example, a context reference associated with the note. The context information may further include GUI information for the GUI window used to display the target document when the note was originally taken, such as position of a GUI window, size of a GUI window, a vertical or horizontal scroll position of a GUI window, and any other state information useful in replicating a context for the operating environment of the target document as recorded when the note was originally authored. The context recording module may store the recorded context information with the note.

When an operator displays or opens the note again, the inserted context reference will appear with the note. An operator may select and activate the context reference to open the document associated or linked with the note. The context generation module may generate a context for the corresponding target document using the context reference and context information. As a result, an operator may quickly and seamlessly recreate a context for a note using context references and context information without having to manually search a file path to where the actual document is stored or resides.

FIG. 1 illustrates a block diagram of a computing system 100. The computing system 100 may represent any computing system, architecture, or infrastructure arranged to store, process, communicate, and otherwise manage shared or associated information processes or operations for an electronic system or collection of electronic systems. As shown in FIG. 1, one embodiment of the computing system 100 may include a computing device 102 coupled to one or more remote computing devices 108. Computing device 102 may comprise two or more application modules 104-1-$m$ coupled to a context management module 106. The context management module 106 may further comprise a context reference module 106$a$, a context recording module 106$b$, and a context generation module 106$c$. Remote computing device 108 may include an application module 110. In some cases, the modules 104, 110 may be the same or similar modules. In other cases, the modules 104, 110 may be arranged as client-server applications or peer-to-peer applications as desired for a given implementation. Additional details for one embodiment of computing device 102 and remote computing device 108 may be further illustrated and described with reference to FIG. 4.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. It may be appreciated that the defined operations may be implemented using more or less modules as desired for a given implementation. It may be further appreciated that the defined operations may be implemented using hardware elements based on various design and performance constraints. The embodiments are not limited in this context.

In various embodiments, the computing system 100 may be used to store, process, communicate, and otherwise manage shared information processes or operations between application programs 104-1-$m$ and/or 110. With respect to computing device 102 and/or remote computing device 108, the context management module 106, the application programs 104-1-$m$ and 110, and/or any shared or associated information (e.g., media context, data structures, data schemas, data files, and so forth) may be stored and accessed via any number of memory units, storage media, machine readable media, or computer-readable media implemented for a given computing device. Computing device 102 and remote computing device 108 may represent any type of electronic device having the appropriate hardware, software or combination hardware and software arranged to execute the operations of the application modules 104-1-$m$, the context management module 106, and/or the application module 110.

In various embodiments, the context reference module 106$a$ may allow the application modules 104-1-$m$ and/or 110 to efficiently share information, such as note information or notes. For example, assume the application module 104-1 is implemented as a MICROSOFT ONENOTE application program. The MICROSOFT ONENOTE application program is a tool for taking notes, information gathering, and multi-user collaboration. The notes may be categorized together into notebooks. The context reference module 106$a$ may allow the notes from the application module 104-1 to be shared by one or more of the other application programs or modules 104-2-$m$. For example, assume the application module 104-2 is implemented as a MICROSOFT WORD application program. The MICROSOFT WORD application program is a word processing application program that can be used to create, modify and manage documents. As a word processing application program, the application program 104-2 may have numerous target documents stored as word processing files.

In various embodiments, the computing device 102 may include the context management module 106. In one embodiment, for example, the context management module 106 may include a context reference module 106a. The context reference module 106a may allow notes managed by the application module 104-1 to be associated with one or more of the various target documents managed by the application module 104-2. For example, a user note for a technical paper stored as a MICROSOFT WORD document may be associated or linked to the technical paper, so that when a user opens the note the target document may also be opened to provide some context information for the note. In one embodiment, for example, the target document may be opened to the same location within the target document (e.g., a given page number, scroll bar position) as when the note was initially taken. Other use scenarios are possible, and the embodiments are not limited in this context.

In some cases, however, it may be difficult or cumbersome for a user to associate or link a given note from the application module 104-1 with a given target document of the application module 104-2. For example, operators or users consume substantial amounts of information every day, and they often take notes on the material they are reading. If printed out, an operator may take notes on the actual document, or if electronic, they may take their notes in a variety of different applications, but usually not the same one in which they are reading. It is often advantageous to take the notes outside of the document primarily because authors often want their notes in the same place as the rest of their notes about other topics. It may be difficult, however, to determine a source for the document since there is rarely a link, file path or reference to the source of the document. An operator may have to manually navigate or traverse the operating system GUI system in order to identify the source location, and then manually generate a file path to the target document. Consequently, an operator may have difficulty determining where a document is stored or resides (in memory, for example).

The context reference module 106a may implement various techniques or provide various application program interfaces (API) to allow a user to create notes with the application program 104-1, generate a list of context references for open target documents displayed by the application program 104-2 (or other application programs), and associate one or more of the context references with a given note. This may be accomplished, for example, by inserting a context reference into the application program 104-2 or the note itself.

In various embodiments, a context reference may represent or indicate a source for a target document. The source may comprise a location for the target document. For example, the source may comprise a memory or storage location indicating where the target document is stored in volatile or non-volatile memory on the computing devices 102. In some cases, for example, the source of the target document may comprise a different device, such as the remote computing device 108. The context reference itself may comprise any information to facilitate retrieval and access of the target document. Examples of suitable context references may include links, hyperlinks, file paths, pointers, addresses, network connections, protocol commands, and so forth. The context reference should provide sufficient information for an operator to automatically open the target document, including any information needed to access network storage locations such as the remote computing device 108, for example.

In general operation, assume an operator uses the application program 104-1 to create notes regarding a target document displayed by the application program 104-2. The context reference module 106a may generate a context reference indicating a source or location for any document displayed by the application program 104-2 including the target document. The context reference module 106a may display the list of context references. An operator may then select and associate the context reference with the desired note, using the GUI controls provided by the OS or a proprietary GUI interface provided by the context reference module 106a.

A context reference may be associated with a given target document in a number of different ways. For example, the application program 104-1 may maintain a lookup table of links between certain notes and certain documents. Whenever an operator selects and opens a note, the application program 104-1 may traverse the lookup table to find any context references associated with the opened note, and open the target documents using the context references. In another example, the application program 104-1 may store a context reference with each note. An operator may select and insert the context reference within the actual note. This may be accomplished by using "drag-and-drop" GUI techniques. Whenever an operator opens or access a note with an embedded context reference, a note view may display the note and the context reference in a form that is easily selectable and activated by the operator to open a corresponding target document in its native application program.

In one embodiment, for example, the context reference module 106a may generate context references for a target document when displayed. In normal operation, an operator typically takes notes on target documents when displayed by the application program 104-2. When an operator is taking notes, the context reference module 106a may automatically, or in response to an operator command, generate context references for any open documents managed by the application program 104-2. The context reference module 106a may display a list of context references for the open documents, and an operator may select and associate the desired context references with a given note. When an operator opens a note and activates an embedded context reference, the application program 104-2 may open the target document to provide a context for the note.

In one embodiment, for example, the context reference module 106a may generate context references with a specific location within a target document when displayed. In addition to generating a list of context references to any open documents managed by the application program 104-2, the context reference module 106a may generate context references to a specific location within any open documents. For example, if a target document is opened to a certain page when the note is generated, then the context reference module 106a may generate a context reference to not only include a source for the target document, but the specific page number for the target document that was displayed when the note was taken. When an operator opens a note and activates an embedded context reference, the application program 104-2 may open the target document to the specific location within the target document, thereby providing a context for the note.

In one embodiment, for example, the context reference module 106a may be arranged to generate a context reference view to display the context reference. In order to assist an operator in selecting and associating a context reference with a note, the context reference module 106a may provide a context reference view to display a list of context references. The context reference view may be displayed by a separate GUI window from the GUI window used to display the application programs 104-1, 104-2. An operator may then use a pointing device to select a desired context reference by clicking on the context reference, dragging the context reference from the context reference view window to the note view window, and dropping the context reference in the note view window.

In one embodiment, for example, the context reference module 106a may be arranged to generate a context reference view to display a list of context references while maintaining a note view for the note. The context reference module 106a may allow a user to remain in the user context or user experience of the application programs 104-1, 104-2 while creating, associating and viewing the context references generated by the context reference module 106a. For example, the context reference module 106a may be arranged to generate a new GUI window to display the list context references. The new GUI window with the context reference view may be superimposed on the GUI window used to display the application programs 104-1, 104-2. Alternatively, the displayed GUI windows may be automatically sized to allow an operator to view all the open GUI windows for the application program 104-1, 104-2 and the context reference module 106a on a given screen or display. For example, when the user takes/views notes on a target document, the context reference view may be displayed in a "docked-to-desktop" GUI window, which can then be maximized if desired. The context reference module 106a should be able to cause the context references to be displayed in the docked context reference view GUI window.

In one embodiment, for example, the context management module 106 may include a context recording module 106b. The context recording module 106b may be arranged to store context information for the target document. In some cases, the context information may include, for example, a context reference associated with the note. The context information may further include GUI information for the GUI window used to display the target document when the note was originally taken, such as position of a GUI window, size of a GUI window, a horizontal or vertical scroll position of a GUI window, and any other state information useful in replicating a context for the environment of the target document as recorded when the note was originally authored.

In some implementations, the context recording module 106b may be arranged to store context information for a target document when a context reference is associated with the target document. The context recording module 106b may implement logic to start recording context information based on a variety of entry points, such as the presence of a context reference (e.g., a hyperlink), an attachment, or some other reference to materials external to the note. For example, when an operator instructs the context reference module 106a to associate a context reference with a given note, the context recording module 106b may detect the association event and begin recording detailed context information about the target document and its GUI environment or settings. The recorded context information may be used to generate a context for a target document associated with the note.

In one embodiment, for example, the context management module 106 may include a context generation module 106c. The context generation module 106c may be arranged to generate a context for a note by displaying a document view for a target document using stored context information when the note is displayed. The context generation module 106c may be used to display a document view for a target document in a manner substantially similar to a document view stored when the note was initially created. For example, when reviewing a note having an embedded context reference, a user may select the embedded context reference to open a target document corresponding to the context reference. The context generation module 106c may receive the operator command to generate a context for the corresponding target document, and retrieve the context information stored for the target document. The context generation module 106c may then launch the application program 104-2 to display the target document in a context or environment similar to the context or environment present when the note was originally authored. For example, the target document may have a document view with a GUI window having the same size and location on a display as when originally recorded.

In some implementations, the context generation module 106c may be arranged to display a document view for a target document at a specific location within the target document. For example, the context generation module 106c may launch the application program 104-2 to display the target document using a document view with a GUI window having the same size and location as when originally recorded, as well as the horizontal and/or vertical scroll of the GUI window to display a given location or page within the target document. In some cases, the document view may include any selected or highlighted areas or portions of the displayed target document.

Operations for the computing system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the computing system 100 or alternative elements as desired for a given set of design and performance constraints.

FIG. 2A illustrates a logic flow 200. The logic flow 200 may be representative of the operations executed by one or more embodiments described herein. As shown in FIG. 2A, the logic flow 200 may create a note with a first application program at block 202. The logic flow 200 may generate a context reference for a document for a second application program at block 204. The logic flow 200 may display the context reference at block 206. The logic flow 200 may associate the context reference with the note at block 208. For example, the context reference may be associated with the note by inserting the context reference within the note. The embodiments are not limited in this context.

In one embodiment, for example, the logic flow 200 may generate a context reference for a document for a second application program at block 204 in a number of different ways. For example, the logic flow 200 may generate the context reference to represent a source or location for the second application program. In another example, the logic flow 200 may generate the context reference for the document when stored or displayed. In yet another example, the logic flow 200 may generate the context reference for a specific location within the document when displayed, such as a page number. In still another example, the logic flow 200 may generate a context reference view to display the context reference. The context reference view may be in a separate GUI window docked or floating relative to the GUI window used to display a note view or a document view. The embodiments are not limited in this context.

Figure 2B:
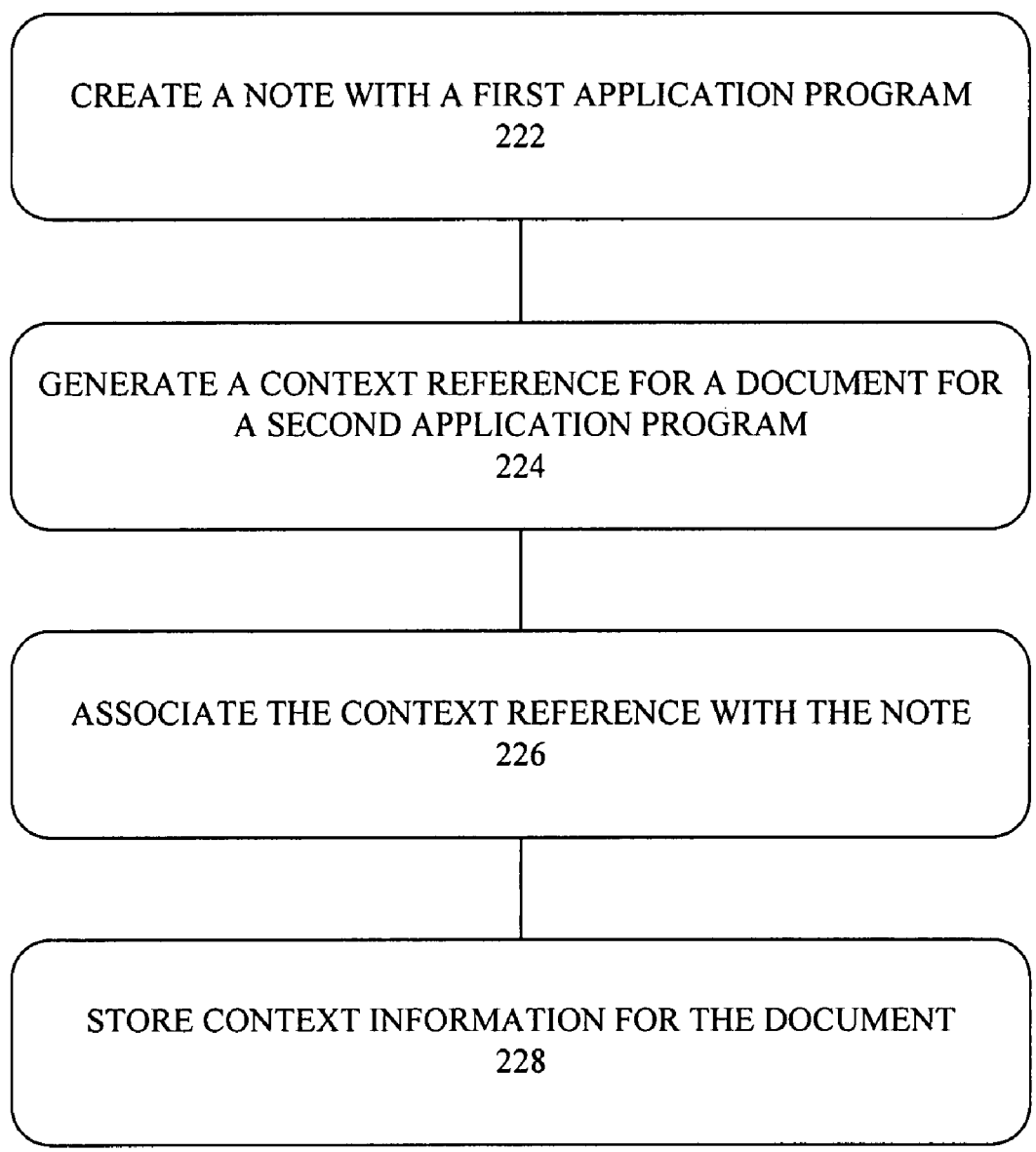
FIG. 2B illustrates one embodiment of a second logic flow.

FIG. 2B illustrates a logic flow 220. The logic flow 220 may be representative of the operations executed by one or more embodiments described herein. As shown in FIG. 2B, the logic flow 220 may create a note with a first application program at block 222. The logic flow 220 may generate a context reference for a document for a second application program at block 224. The logic flow 220 may associate the context reference with the note at block 226. The logic flow 220 may store context information for the document at block 228. For example, the logic flow 220 may store the note with both the context reference and the context information. The embodiments are not limited in this context.

In some implementations, the note may be displayed with a visual indicator for the context reference and the context information. Examples of visual indicators may include an icon, image, animation, picture, graphic, and so forth. For example, a button or some other selectable icon can be presented next to the note that when clicked or selected will open the file it was taken about, position and size the window to be the same as when the note was taken, and also restore the scroll of the window and selection to the same state it was in when the note was taken. In this manner, the presence of associated documents for a note may be advertised to an operator.

In some implementations, the target document may be displayed using the context information when the note is opened. For example, an operator may open a note, and select a context reference in the form of a hyperlink to launch context generation operations to open the target document in its original context. In another example, an operator may open a note, and the context generation module 106c may detect the presence of a context reference, and automatically open the target document in its original context using the previously recorded context information.

In one or more embodiments, the context generation module 106c may attempt to display the document with a document view substantially similar to a document view recorded when the note was created using the context information. The context recording module 106b attempts to record as much detailed context information about a target document as available, or in accordance with a set of context recording rules selected by an operator or by default. In order to recreate a context for a target document, the context generation module 106c retrieves the context information, and attempts to faithfully recreate the details of the GUI views and presentation for the target document. In this manner, an operator may be presented with a consistent user context or experience when reading a note that substantially matches the user context or experience when the note was originally taken. As a result, a user may be able to start/stop note taking operations, organize and collect supporting documents, store notes as a collective notebook rather than with the supporting documents, and so forth.

In one or more embodiments, the context generation module 106c may display a visual indicator with a target document indicating an associated note. For example, when the context reference module 106a associates a context reference with a given note, the context reference module 106a may also store information about the associated note with the application program 104-2. When an operator opens the application program 104-2 and/or a target document having an associated note, the application program 104-2 and/or the target document may include a visual indicator to convey such information to the operator. Examples of visual indicators may include an icon, image, animation, picture, graphic, and so forth. In this manner, the presence of associated notes for a target document may be advertised to an operator.

Figure 3:
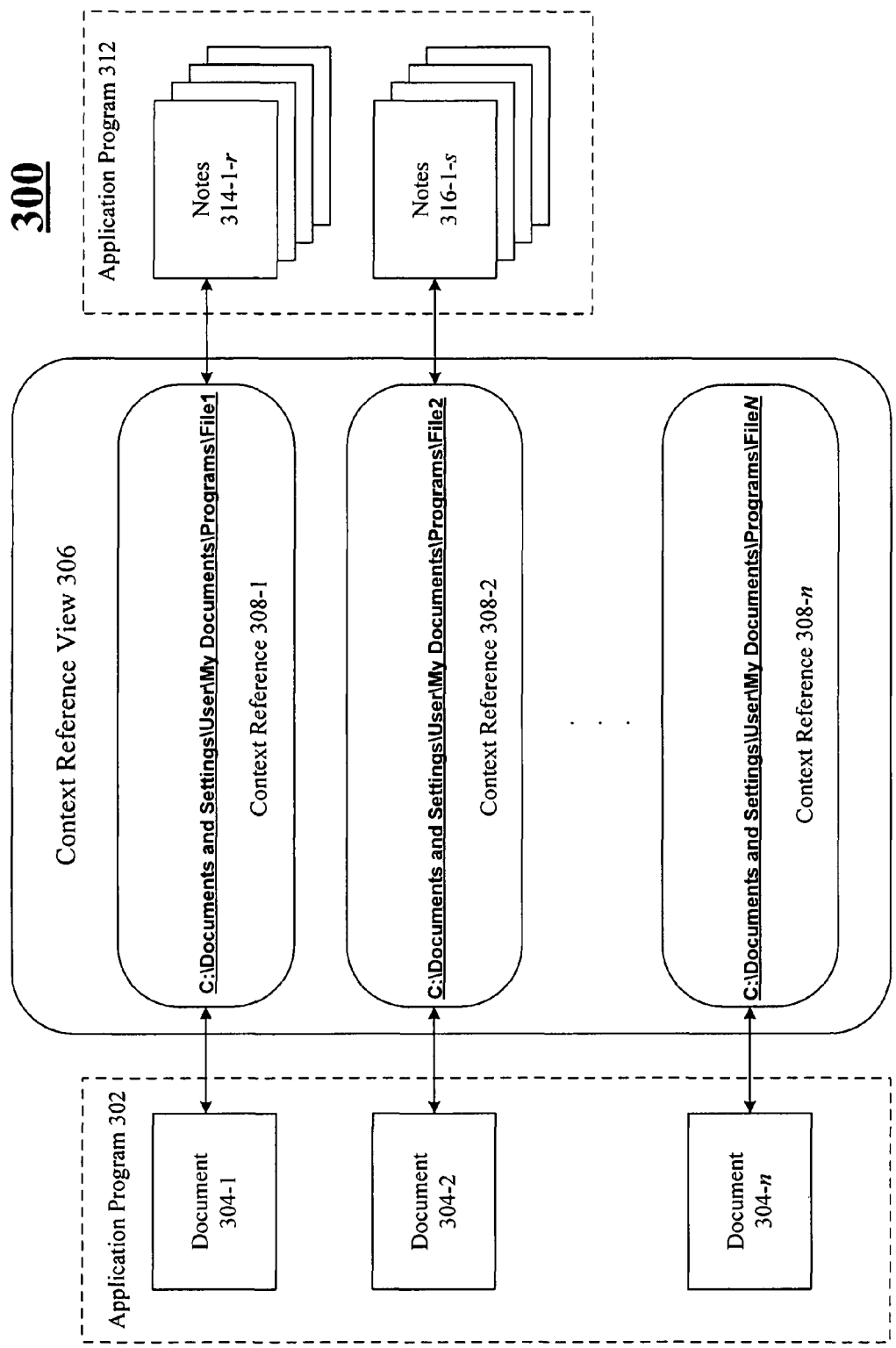
FIG. 3 illustrates one embodiment of context references.

FIG. 3 illustrates a logic diagram 300. The logic diagram 300 illustrates application programs 302, 312. The application programs 302, 312 may be representative of one or more of the application programs 104-1-$m$ and/or 110, such as the application programs represented by the respective application modules 104-2, 104-1. The application program 302 may have multiple target documents 304-1-$n$. The target documents 304-1-$n$ may represent individual documents, files, items or objects for the application program 302. The target documents 304-1-$n$ may each be displayed in a respective GUI window or other user interface view. The application program 312 may include various notes, such as one or more notes 314-1-$r$ and one or more notes 316-1-$s$.

In one embodiment, for example, an operator may create notes 314, 316 with the application program 312. The context reference module 106a may determine the note creation operations, and generate a set of context references 308-1-$n$, each representing a context reference for a corresponding document 304-1-$n$. For example, the document 304-1 may have a corresponding context reference 308-1 comprising the following hyperlink:

C:\Documents and Settings\User\My Documents\Programs\File1

The context reference 308-1 may therefore represent an executable shortcut or file path to the source document, and may be used to access, open or execute the source document. The context reference module 106a may display the context references 308-1-$n$ in a context reference view 306.

In one embodiment, for example, an operator may determine whether a target document 304-1-$n$ for the application program 302 should be associated with a note from the application program 312. For example, the operator may create a note 314-1, and drag-and-drop the context reference 308-1 into the application program 312 and/or the note 314-1. Similarly, the operator may create a note 316-1, and cut-and-paste the context reference 308-2 into the application program 312 or the note 316-1. The application program 312 may store the associated or embedded context references 308-1, 308-2 with the respective notes 314-1, 316-1. Whenever the notes 314-1, 316-1 are next opened by an operator, the notes 314-1, 316-1 may display the respective context references 308-1, 308-2. The operator may select the context references 308-1, 308-2 to access or open the respective documents 304-1, 304-2 to display the contents of the documents 304-1, 304-2 on a display for the operator to view and correlate with the respective notes 314-1, 316-1.

In one embodiment, for example, the context reference module 106a may automatically determine whether a target document 304-1-$n$ for the application program 302 should be associated with a note from the application program 312. An example of the latter case is that the context reference module 106a may assume that any open GUI windows containing the documents 304-1-$n$ are associated with a given note when created or opened. A GUI dialog box may be used to allow the user to finalize the association between any open documents and open notes.

Once one or more context references 304-1-$n$ have been associated with one or more of notes 314, 316, then the context recording module 106b may detect the presence of the associated context references and initiate context recording operations. The context recording module 106b may begin recording context information for the associated documents, such as GUI window size, GUI window location or position, GUI horizontal and vertical scroll positions, GUI colors, selected or highlighted portions of a target document, embedded notes or comments in a target document, image screenshots, and so forth. The context recording module 106b may record the appropriate context information until a terminating condition has been reached, such as manually termination instructions from an operator, fulfillment of a set of context information recording rules, expiration of a defined time period, closure of the target document or note, and so forth.

When an operator opens a note having associated context references and context information, the context generation module 106c may be used to generate a context for the associated target document using the recorded context information. For example, an operator may select the context reference 308-1 presented as a hyperlink embedded within the note 314-1. The context generation module 106c may receive the input selection, and launch the application program 104-2 to display the target document 304-1. The context generation module 106c may retrieve and use the associated context information to present the target document in a manner similar to when the target document was initially used by an operator to author the note 314-1.

Figure 4:
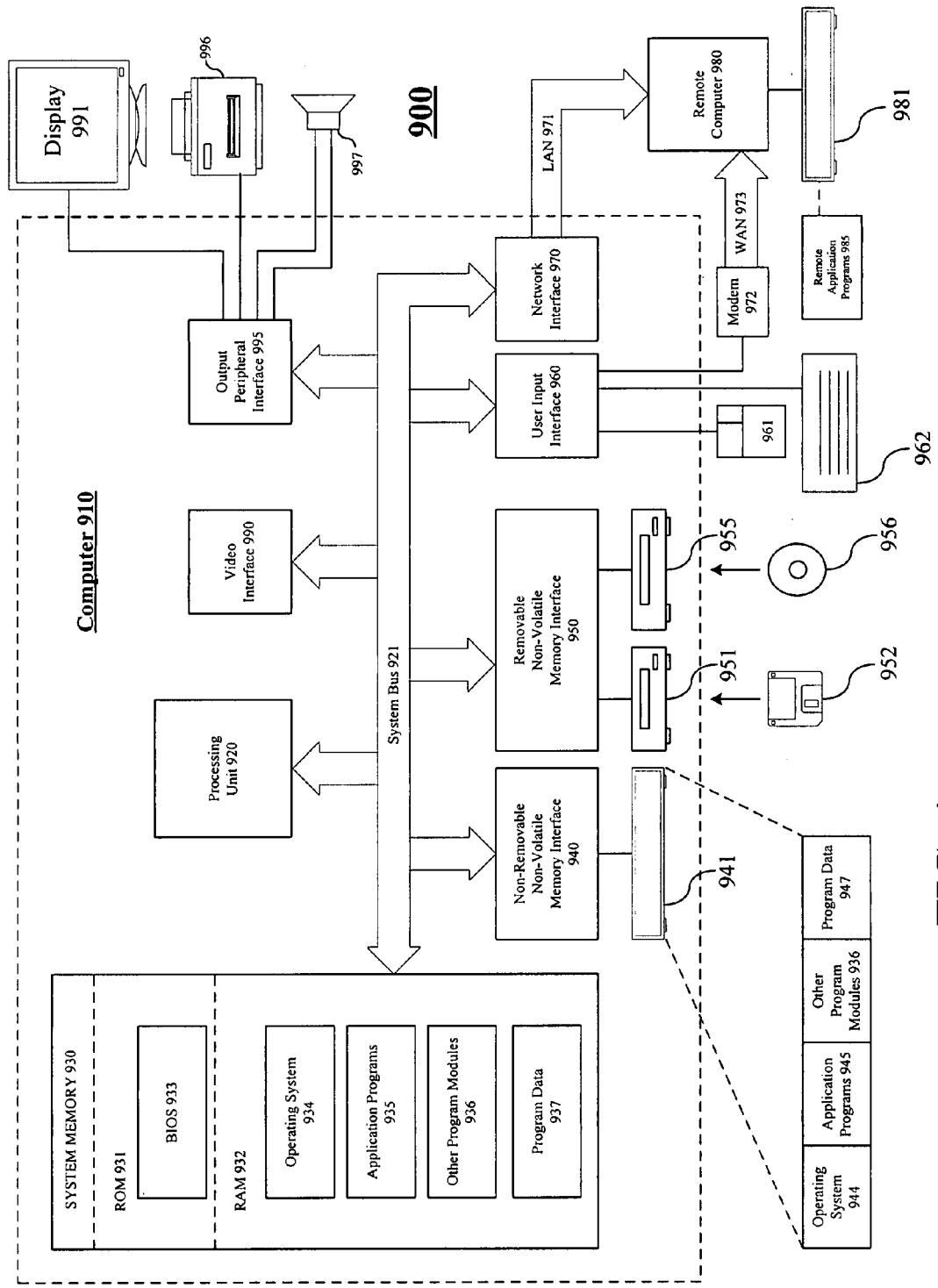
FIG. 4 illustrates one embodiment of a computing system architecture.

FIG. 4 illustrates a block diagram of a computing system architecture 900 suitable for implementing various embodiments, including the computing system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or nonvolatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 4 illustrates operating system 934, application programs 935, other program modules 936, and program data 937.

The computer 910 may also include other removable/non-removable, volatile/nonvolatile computer storage media. By way of example only, FIG. 4 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 4, provide storage of computer readable instructions, data structures, program modules and other data for the computer 910. In FIG. 4, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 4 for clarity. The logical connections depicted in FIG. 4 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 4 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the computing system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   creating a note with a first application program;
   generating a context reference for a document for a second application program, the context reference comprising context information useable to recreate a user context for the document;
   displaying the context reference; and
   associating the context reference with the note.

2. The method of claim 1, comprising associating the context reference with the note by inserting the context reference within the note.

3. The method of claim 1, comprising generating the context reference to represent a source for the second application program.

4. The method of claim 1, comprising generating the context reference for the document when displayed.

5. The method of claim 1, comprising generating the context reference for a specific location within the document when displayed.

6. The method of claim 1, comprising generating a context reference view to display the context reference.

7. The method of claim 1, comprising generating a context reference view to display the context reference while maintaining a note view for the note.

8. An article comprising a computer-readable storage medium containing instructions that if executed enable a system to:
   create a note with a first application program;
   generate a context reference for a target document for a second application program, the context reference comprising context information useable to recreate a user context for the document; and
   insert the context reference within the note.

9. The article of claim 8, further comprising instructions that if executed enable the system to display the context reference in a context reference view.

10. The article of claim 8, further comprising instructions that if executed enable the system to generate the context reference to represent a source for the second application program.

11. The article of claim 8, further comprising instructions that if executed enable the system to generate the context reference for the target document when displayed.

12. The article of claim 8, further comprising instructions that if executed enable the system to generate the context reference for a specific location within the target document when displayed.

13. The article of claim 8, further comprising instructions that if executed enable the system to generate a context reference view to display the context reference.

14. The article of claim 8, further comprising instructions that if executed enable the system to generate a context reference view to display the context reference while maintaining a note view for the note.

15. An apparatus comprising:
   a first application program to create notes for an operator;
   a second application program to display a target document; and
   a context reference module to generate a context reference for the target document indicating a source for the target document and comprising context information useable to recreate a user context for the target document, display the context reference, and associate the context reference with a note.

16. The apparatus of claim 15, the context reference module to insert the context reference within the note.

17. The apparatus of claim 15, the context reference module to generate the context reference for the target document when displayed.

18. The apparatus of claim 15, the context reference module to generate the context reference for a specific location within the target document when displayed.

19. The apparatus of claim 15, the context reference module to generate a context reference view to display the context reference.

20. The apparatus of claim 15, the context reference module to generate a context reference view to display the context reference while maintaining a note view for the note.

* * * * *